US007450362B2

(12) United States Patent
Müller et al.

(10) Patent No.: US 7,450,362 B2
(45) Date of Patent: Nov. 11, 2008

(54) METHOD AND APPARATUS FOR DISCONNECTION OF A FAULT CURRENT WHICH HAS OCCURRED IN AN AC POWER SUPPLY SYSTEM

(75) Inventors: Lorenz Müller, Gebenstorf (CH); Michael Stanek, Gebenstorf (CH)

(73) Assignee: ABB Technology AG, Zurich (CH)

(*) Notice: Subject to any disclaimer, the term of this patent is extended or adjusted under 35 U.S.C. 154(b) by 0 days.

(21) Appl. No.: 11/593,068

(22) Filed: Nov. 6, 2006

(65) Prior Publication Data

US 2008/0019063 A1 Jan. 24, 2008

Related U.S. Application Data

(63) Continuation of application No. PCT/CH2005/000232, filed on Apr. 26, 2005.

(30) Foreign Application Priority Data

May 4, 2004 (DE) ....................... 10 2004 021 978

(51) Int. Cl.
*H02H 3/00* (2006.01)

(52) U.S. Cl. ......................................... 361/95; 307/143

(58) Field of Classification Search ................. 307/140, 307/143; 361/95, 96, 97, 42
See application file for complete search history.

(56) References Cited

U.S. PATENT DOCUMENTS 5,644,463 A * 7/1997 El-Sharkawi et al. ......... 361/94
6,297,569 B1 * 10/2001 Bartels et al. ............... 307/140

FOREIGN PATENT DOCUMENTS

CH 443 443 A 4/1966
EP 0 938 114 B1 4/2003
EP 1 484 780 A1 12/2004

OTHER PUBLICATIONS

International Preliminary Report of Patentability for PCT/CH2005/000232 dated Mar. 29, 2007.
International Search Report.

* cited by examiner

*Primary Examiner*—Michael J Sherry
*Assistant Examiner*—Michael Rutland Wallis
(74) *Attorney, Agent, or Firm*—Buchanan Ingersoll & Rooney PC

(57) ABSTRACT

A method and an apparatus are disclosed for disconnection of a fault current which has occurred in an AC power supply system. A disconnection command which is produced in a protective device is supplied to a synchronization controller in order to open a circuit breaker, in which synchronization controller a command is delayed until the circuit breaker can be opened in synchronism with the power supply system. The method includes monitoring of the disconnection command emitted from the protective device and monitoring a fault-current signal, or a status signal emitted from the circuit breaker, and formation of an emergency disconnection command if the fault-current signal or the status signal is still present following a delay time after emission of the disconnection command, which delay time is greater than a sum of a natural response time of the circuit breaker and a time for quenching of a switching arc produced on opening of the circuit breaker.

11 Claims, 4 Drawing Sheets

METHOD AND APPARATUS FOR DISCONNECTION OF A FAULT CURRENT WHICH HAS OCCURRED IN AN AC POWER SUPPLY SYSTEM

RELATED APPLCATIONS

This application claims priority under 35 U.S.C. §119 to German Application 102004021978.8 filed in Germany on 4 May 2004, and as a continuation application under 35 U.S.C. §120 to PCT/CH2005/000232 filed as an International Application on 26 Apr. 2005 designating the U.S., the entire contents of which are hereby incorporated by reference in their entireties.

FIELD

A method and apparatus are disclosed for disconnection of a fault current which has occurred in an AC power supply system. Such a method and apparatus can, for example, be used in high-voltage power supply systems, and can be used in medium-voltage or low-voltage power supply systems.

BACKGROUND INFORMATION

Methods and apparatuses are known for switching of fault currents in synchronism with a power supply system, as is described in CH 443 443 A and EP 938 114 A1, the contents of which are hereby incorporated by reference in their entireties.

In the case of a method as described in CH 443 443 A for disconnection of a fault current which has occurred in an AC power supply system, the disconnection command for opening a high-voltage circuit breaker is delayed until the current, which is oscillating at the power supply system frequency, has the tendency to fall after passing through a current maximum and has fallen below a limit value. It is thus possible to disconnect short circuits with high current amplitudes without them having any effect, and without unacceptably mechanically, electrically and/or thermally loading the circuit breaker.

An apparatus which is already known from EP 938 114 A1 for disconnection in synchronism with the power supply system of a circuit breaker which is arranged in a high-voltage AC power supply system has an appliance which controls the disconnection of the circuit breaker in synchronism with the power supply system, as well as a high-level protective device, which emits a command for disconnection of the circuit breaker when a fault current occurs. The controller is able to identify the fault current and, taking into account the natural response time of the circuit breaker and the next zero crossing of the fault current, to calculate a lead time, after which the disconnection command is passed to the circuit breaker, which is disconnected in synchronism with the power supply system.

U.S. Pat. No. 6 297 569 B1 describes a controllable power supply 10 with a high level of redundancy, with a power switching system 11 and with a control system 12. The power switching system 11 contains two series-connected switches 18 and 20 which are arranged between a current source 15 and a load 22. If one of these two switches can no longer be disconnected, for example because its switching contacts have stuck, then the other switch carries out this disconnection function. For this purpose, voltage sensors 23 and 26 are used to detect voltages which are present on the sides of the switches 18 and 20, respectively, which face the load and which describe the status of the switches 23, 26. The control system 12 is in the form of a microcontroller and has a logic circuit to which the detected voltage signals are supplied, and to which the switching commands 1 are supplied via an input 50. Outputs of the control system 12 act on two driver stages, which respectively have an associated relay K1 for the switch 18 and a relay K2 for the switch 20. In trials runs, in which the switching command 1 as well as the two status signals can be delayed with respect to one another, it is possible to determine in the control device whether both switches are still serviceable or whether the higher-level of the two switches, specifically 18, has stuck. If the control apparatus finds a fault such as this, then it determines that, as an emergency solution, the lower-level switch 20 will then take over the function of the higher-level switch 18.

The known power supply is neither suitable for disconnection of a fault current nor does it have a synchronization controller in which a disconnection command is delayed until the switch can be opened in synchronism with the power supply system, that is to say at a zero crossing of the current to be disconnected. Column 4, lines 36 to 39 just indicates that forms of switching-pulse and waveform peaks occur as well as zero crossings when alternating current is being carried, which the voltage sensors have to cope with and for which solutions exist in the prior art. Column 15, second paragraph relates only to the idea that the higher-level switch 18 carries out the normal current switching processes, and that, and in an emergency when the higher-level switch 18 has failed, the lower-level switch 20 is intended to takeover these switching tasks.

DESCRIPTION OF THE INVENTION

The invention as it is defined in patent claims 1 to 7 achieves the object of providing a method and an apparatus of the type mentioned initially, which are each distinguished by high operational reliability and safety.

In the case of the method according to the invention, this high operational reliability and safety are achieved by carrying out the method steps stated in the following text:

monitoring of the disconnection command emitted from the protective device and of the fault current, or of a status signal emitted from the circuit breaker, and formation of a first emergency disconnection command if the fault current or the status signal is still present following a first delay time after emission of the disconnection command, which first delay time is greater than the sum of the natural-response time of the circuit breaker and the time for quenching of a switching arc produced on opening of the circuit breaker.

The method according to the invention can also be used for reliable and safe disconnection when the synchronization controller is defective, since a suitably designed photoprotective device can rapidly identify the defect and can easily implement the disconnection process once a short first delay time has elapsed. Once the first delay time has elapsed, the direct-current component which is present in the fault current is reduced. Mechanical, thermal and electrical loading of the circuit breaker during disconnection, as a result of the influence of fault currents and switching arcs, can thus be considerably reduced. This can prevent severe wear of the circuit breaker, and its premature aging.

If the direct-current component of the fault current is reduced, as is permissible in high-voltage power supply systems, with an exemplary time constant of 45 ms, then, after a delay time of, for example, about 30 to 70 ms, the maxima of the current amplitudes have already been reduced to such an extent that the circuit breaker is no longer subject to excessive high loads.

The method can be implemented in such a manner that the disconnection command which is emitted from the protective device, as well as the amplitude of the fault current are still monitored even after the first delay time has elapsed and that, independently of the first, a second emergency disconnection command is formed if the fault current is still present after a second delay time has passed since the emission of the disconnection command, which second delay time is greater than the first. These additional method steps ensure selective failure protection, which can distinguish between a defective synchronization controller and a defective circuit breaker.

Good selectivity can be achieved with a delay time of, for example, about 50 to 150 ms. The current amplitude maxima have then already reduced to such an extent that a reserve circuit breaker, which is operated instead of the defective circuit breaker, is subject to only minor loads.

In the case of an exemplary apparatus, a failure protective device is provided which ensures reliable and safe disconnection of the fault current by emission of an emergency disconnection command when the synchronization controller is defective. This failure protective device can be provided using simple means, and can easily be integrated in the already existing protective device.

For an exemplary defective synchronization controller, the failure protective device contains a first protective apparatus with the components which are described are in the following text and are simple to implement: a first input for detection of the disconnection command and a second input for detection of a fault-current signal or of the status signal, a first delay element, which is connected downstream from the first input and has a first delay time which is greater than a sum of a natural response time of the circuit breaker and a time for quenching of a switching arc which can be produced on opening of the circuit breaker, a first AND element which logically links the delayed disconnection command and the fault-current signal or the status signal with one another, and an output which acts on the circuit breaker and at which the emergency disconnection command is produced once the first delay time has elapsed.

For an exemplary defective circuit breaker, the failure protective device contains a second protective apparatus, which likewise can have components which are simple to implement. These components are as follows: a first input for detection of the disconnection command and a second input for detection of the fault-current signal, a second delay element, which is connected downstream from the first input and has a second delay time which is greater than a sum of a natural response time of the circuit breaker and a time for quenching of a switching arc which can be produced on opening of the circuit breaker, a second AND element which logically links the delayed disconnection command and the fault-current signal with one another, and an output which acts on a further circuit breaker, at which the emergency disconnection command is produced once the second delay time has elapsed.

DESCRIPTION OF THE DRAWINGS

Exemplary embodiments and the further advantages which can be achieved thereby will be explained in more detail in the following text with reference to drawings, in which.

Identical reference symbols denote parts having the same effect in all of the figures.

DETAILED DESCRIPTION

Figure 1:
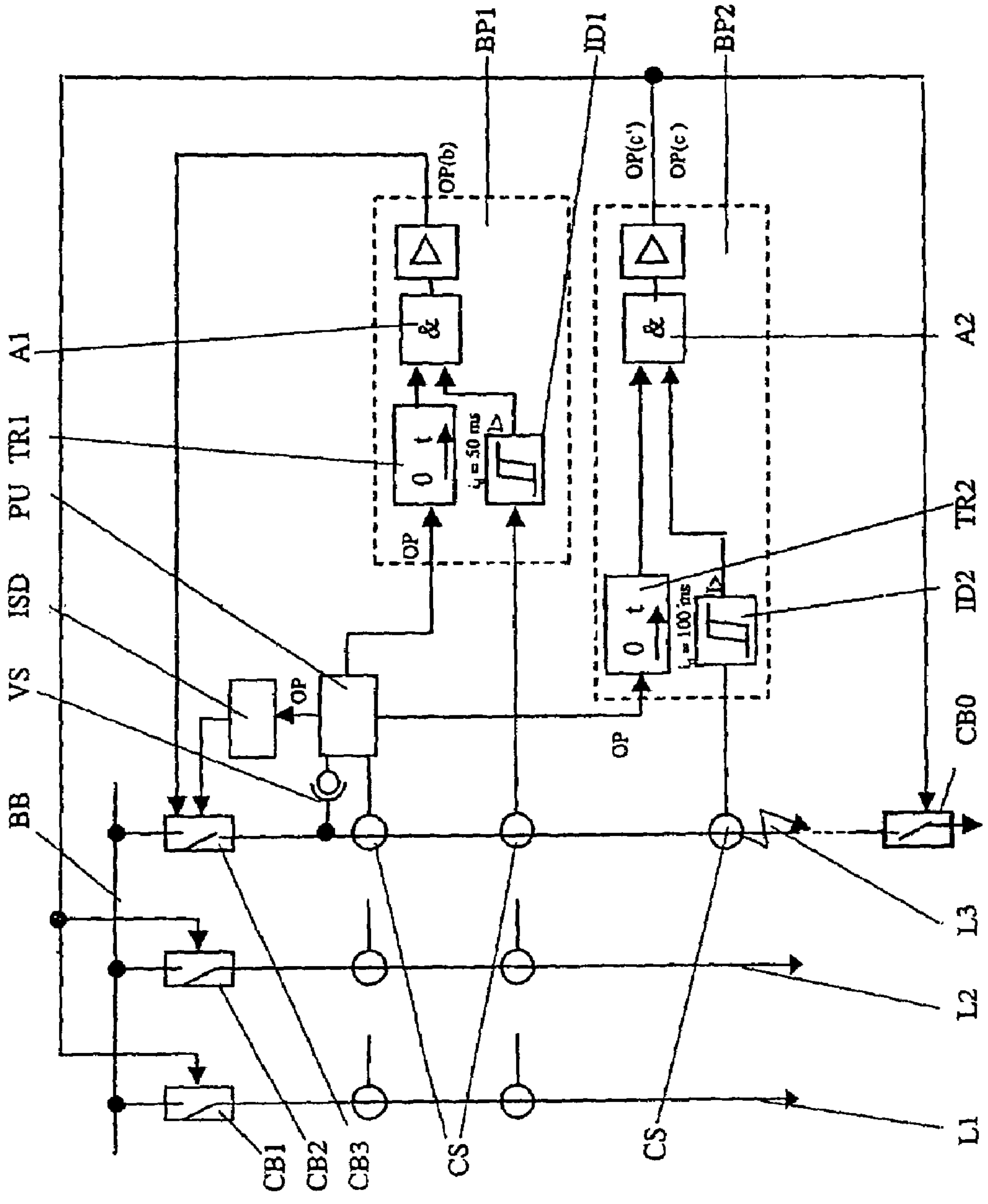
FIG. 1 shows a block diagram of a first exemplary embodiment of the apparatus for disconnection of a fault current, which has occurred in a 50 Hz AC power supply system which carries high voltage, having a circuit breaker, a protective device for production of a disconnection command which acts on the circuit breaker, a synchronization controller and a failure protective device with a protective apparatus BP1 for the synchronization controller and with a protective apparatus BP2 for the circuit breaker.
Figure 2:
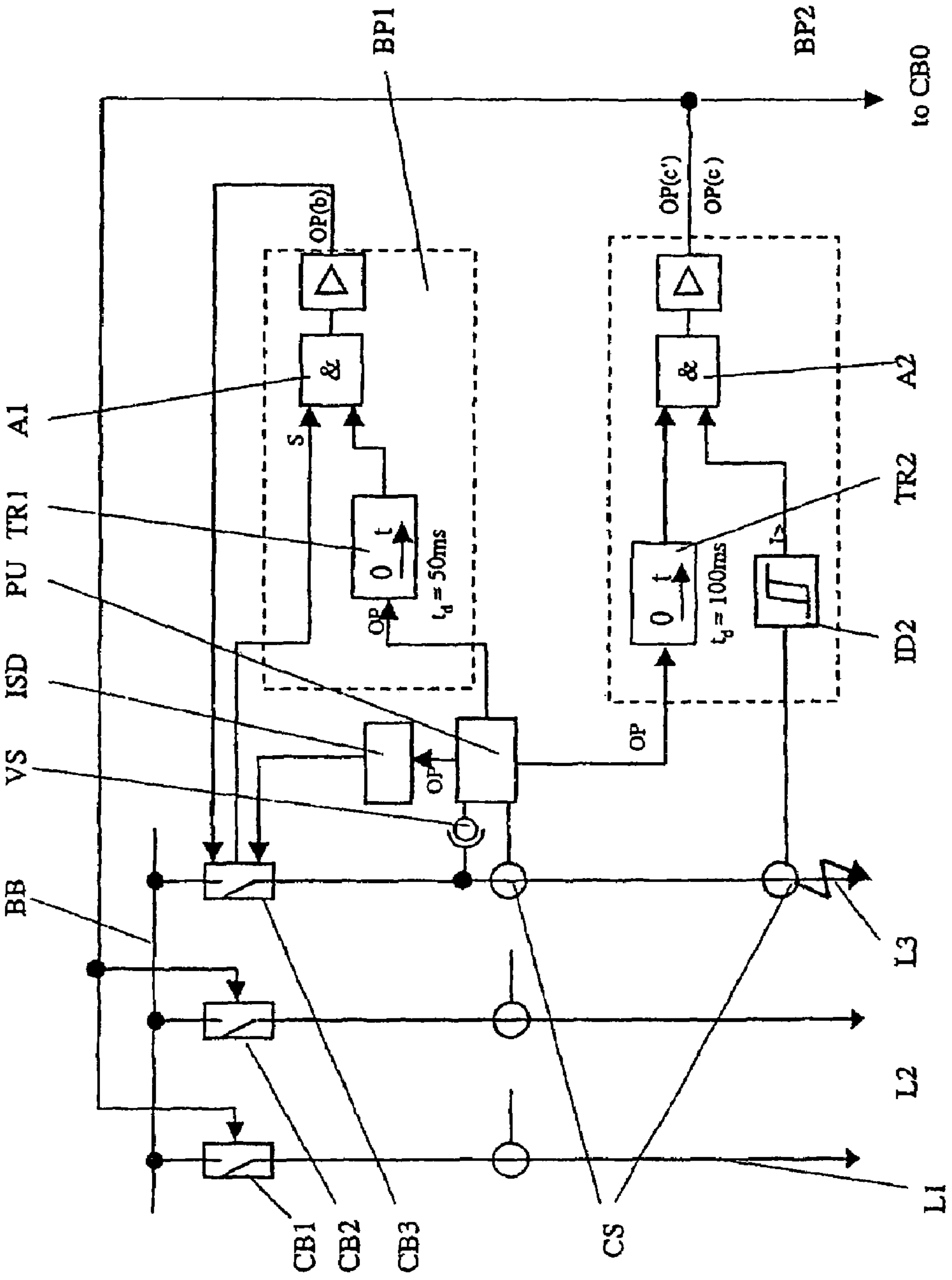
FIG. 2 shows a block diagram of a second embodiment of a synchronous disconnection apparatus which, in comparison to the embodiment shown in FIG. 1, has a modified protective apparatus.

The exemplary apparatuses illustrated in FIGS. 1 and 2 can be used for disconnection of a current being carried in a line L1, L2 or L3. Each of the three lines L1, L2 and L3 is respectively connected via a respective circuit breaker CB1, CB2 or CB3 to a busbar BB. As can be seen from the two figures, a fault marked by a zigzag arrow has occurred on the line L3. This fault leads to the fault current I illustrated in FIG. 4. Current and voltage signals which can be detected continuously by a current sensor CS and a voltage sensor VS are supplied to the protective device PU, which is operatively connected to the outputs of the two sensors. The protective device uses the signals supplied to it to identify the fault and forms a disconnection command OP, which causes only opening of the circuit breaker CB3, depending on the nature of the fault.

As can be seen, the outputs of the protective device PU can be operatively connected to the synchronization controller ISD, to the protective apparatus BP1 for the synchronization controller and to the protective apparatus BP2 for the circuit breaker. The disconnection command OP is thus passed both to the synchronization controller ISD and to the two protective devices BP1 and BP2 for failure protection.

The synchronization controller ISD can include logic which delays the disconnection command, taking into account the circuit breaker natural response time and a zero crossing of the current, until it is possible to open the circuit breaker in synchronism with the power supply system. This therefore contributes to the prevention of switching overvoltages and undesirably high mechanical, thermal and/or electrical loads on the circuit breaker. In order to ensure a maximum possible operational reliability and safety, the synchronization controller ISD can include self-protection, which prevents undesirable disconnection commands from reaching the circuit breaker.

The protective apparatus BP1 for failure protection can provide effective disconnection of the circuit breaker CB3 even if the synchronization controller ISD is defective. It has two inputs. The first input detects the disconnection command OP. The second input detects either—in the same way as the protective device PU—a fault-current signal (embodiment shown in FIG. 1, in which a further current sensor CS is provided for detection of the fault current) or a status signal S of the circuit breaker CB3 (embodiment as shown in FIG. 2, in which the status signal S—circuit breaker CB3 closed—is passed to the protective apparatus BP1).

In the exemplary embodiment shown in FIG. 1, the fault-current signal that is supplied can be monitored in a detector ID1 in the protective apparatus BP1 for a limit value being exceeded, and is passed as a fault-current signal I> to one input of an AND element A1, while, in contrast, in the exemplary embodiment shown in FIG. 2, the status signal S is passed directly to the input of the AND element A1 without any threshold-value detector. In the AND element A1, the fault-current signal I> and the status signal S are in each case compared with the disconnection command OP emitted from the protective device PU. The disconnection command has already been delayed in an element TR1 which is connected to the first input and is connected upstream of the AND element A1. If a signal is produced after the AND logic operation at the output of the protective apparatus BP1, then this signal acts directly as the emergency disconnection command OP(b) on the circuit breaker CB3, causing it to be opened. The time delay $t_d$ is governed by the sum of the circuit breaker natural response time and the time which is required for quenching of the switching arc which is formed on opening of the switch, and, at for example, 50 ms, exceeds the sum of these two times somewhat, for safety reasons.

The failure protection can ensure the operational reliability and safety of the apparatuses shown in FIGS. 1 and 2 even when the circuit breaker CB3 is defective. In this case, the protective apparatus BP2 for failure protection still allows effective disconnection. Specifically, in the same way as the protective device PU, the protective apparatus BP2 can be thus also supplied with the current signal detected by a current sensor CS. This current signal is monitored in a detector ID2 in the protective apparatus BP2 for a limit value being exceeded and is passed to the input of an AND element A2, in which it is compared with the disconnection command OP emitted from the protective device PU. The disconnection command has already been delayed in an element TR2 connected upstream of the AND element A2. If a signal is produced at the output of the protective apparatus BP2 after the AND logic operation, then this signal acts as the emergency disconnection command OP(c') or OP(c) directly on the respective circuit breakers CB1 and CB2 and on the respective circuit breaker CB0 at the other end of the line L3, causing them to be opened. The time delay $t_d$ is governed by the sum of the delay time TR2, the circuit breaker natural response time and the arc time, and, at about 100 ms, exceeds the abovementioned sum slightly, for safety reasons.

Figure 3:
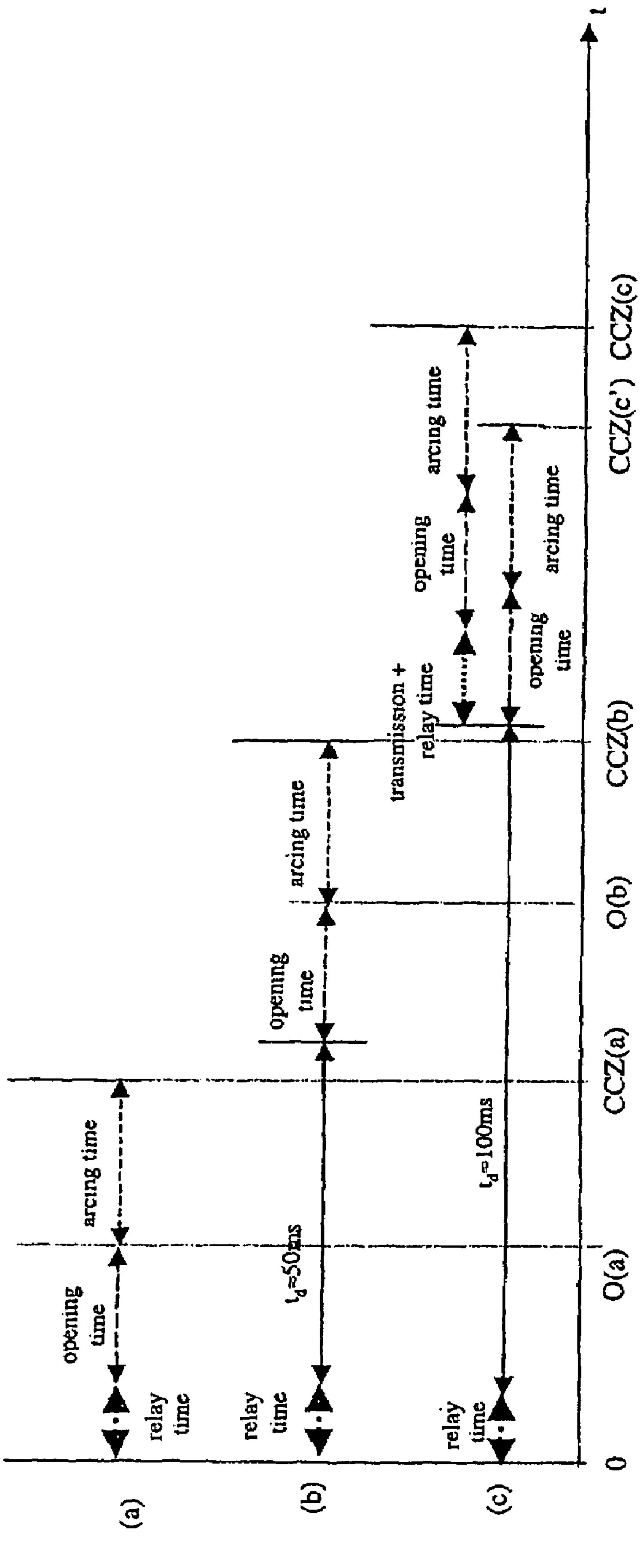
FIG. 3 shows an exemplary sequence of events, which is carried out as a function of time t, on the occurrence and during the disconnection of a fault current in the apparatuses shown in FIGS. 1 and 2, with (a) an intact synchronization controller, (b) a defective synchronization controller, as well as (c) a defective circuit breaker.

The procedures illustrated in FIG. 3 have conservatively been based on a circuit breaker natural response time (=opening time=time between emission of the disconnection command and contact opening) of, for example, 20 ms and a maximum arc time with an intact circuit breaker and with a defective circuit breaker (=arcing time=time between contact opening and arc quenching) of for example, 25 ms. The abovementioned exemplary time delays $t_d$ are each now only slightly greater than the abovementioned sums. The fault current I occurs at the time 0. The reference symbols CCZ(a), CCZ(b) and CCZ(c) denote times at which the fault current has disappeared after a current zero crossing. This disappearance of the fault current is achieved by, for example, disconnection by means of the abovementioned circuit breaker CB3 or, by means of the further circuit breaker CB0 located at the other end of the line L3, with the apparatus shown in FIG. 1 or FIG. 2, respectively, operating in the manner according to (a), (b) or (c) depending on the state of the synchronization controller ISD and/or circuit breaker CB3.

In case (a), that is to say when the synchronization controller and the circuit breaker are both intact, the circuit breaker CB3 is opened. The time CCZ(a) can be determined by the sum of the natural response time (relay time) of the protective device PU, the natural response time (opening time) of the circuit breaker CB3, as well as the time during which a switching arc which has been struck during disconnection burns in the switching gap of CB3 (arcing time). After the time CCZ(a) the switching gap stabilizes very quickly, and can withstand the returning voltage which occurs across the switching gap, without restriking.

As can be seen from the switching behavior illustrated in FIG. 3 for case (b), in which the synchronization controller is defective, the time CCZ(b) to disconnection of the current can be governed by the sum of the following times: the natural response time (relay time) of the protective device PU, the exemplary time delay $t_d$=50 ms of the delay element TR1, the natural response time (opening time) of the circuit breaker CB3 and the time (arcing time) in which the switching arc which has been struck during disconnection burns in the switching gap of the circuit breaker CB3. After the time CCZ(b), the switching gap can be regenerated, and can then withstand the returning voltage which occurs across the switching gap without restriking.

In the case of the switching behavior shown in FIG. 3 for case (c), the circuit breaker CB3 is defective. The time CCZ (c') from which the current is disconnected in the lines L1 and L2 is governed by the sum of the following times: the natural response time (relay time) of the protective device PU, the exemplary time delay $t_d$=100 ms of TR2, the natural response time (opening time) of the circuit breaker CB1 or CB2, respectively, and the time (arcing time) in which the switching arc which was struck during disconnection burns in the switching gap of CB1 or CB2, respectively. The time CCZ(c) from which the current in the line L3 is disconnected can be, in contrast, governed by a sum of the following times: the natural response time (relay time) of the protective device PU, the exemplary delay time $t_d$=100 ms of TR2, the transmission time to the protective device of the circuit breaker CB0 and the natural response time of this protective device (transmission+relay time), the natural response time (opening time) of the circuit breaker CB0 and the arcing time, in which the switching arc which was struck during disconnection burns in the switching gap of the circuit breaker CB0. From the respective time CCZ(c') or CCZ(c), the switching gap of the circuit breaker CB1 or CB2 or of the circuit breaker CB0 can be regenerated, and can then withstand the returning voltage which occurs across the switching gaps, without restriking.

Figure 4:
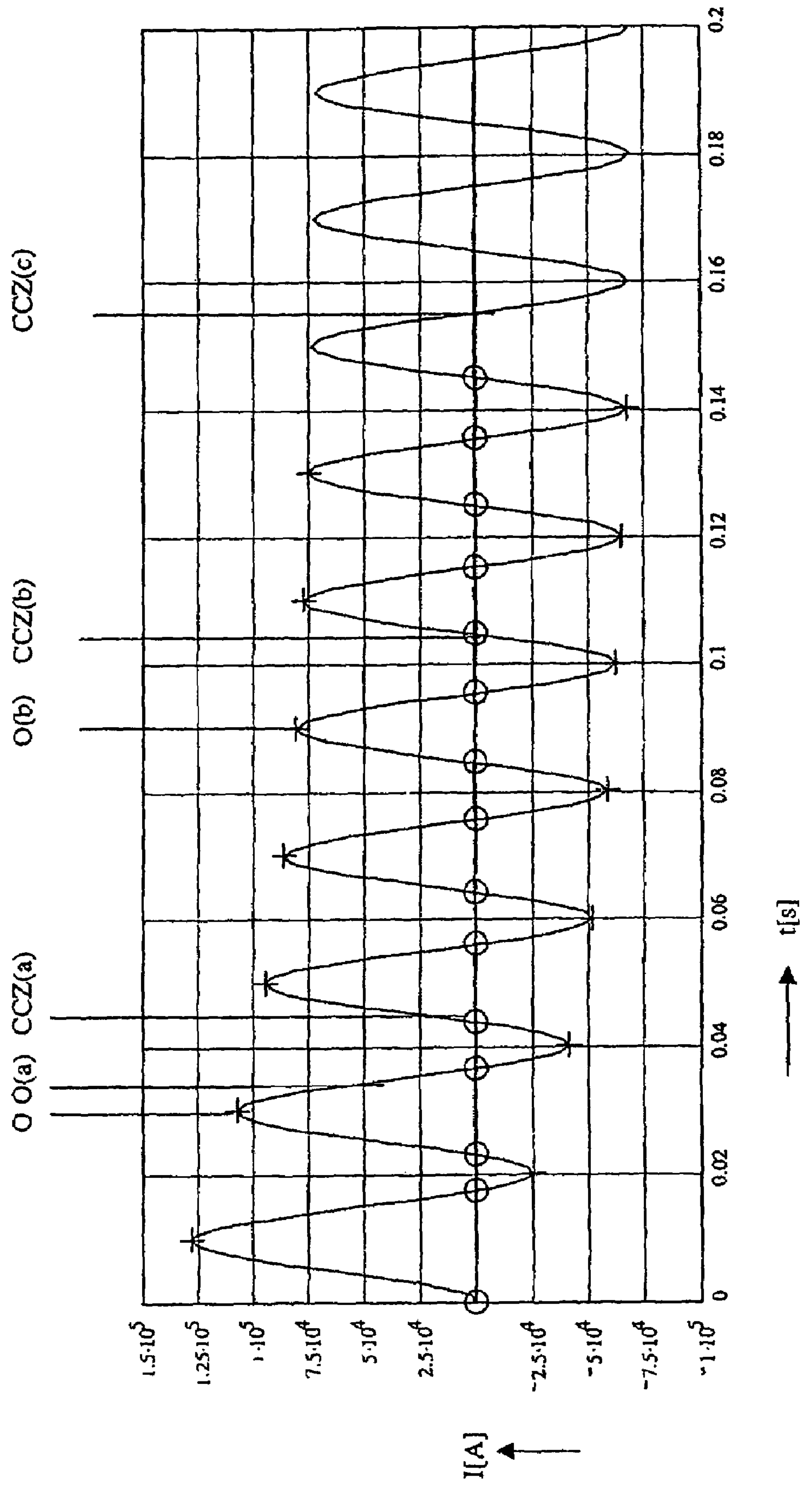
FIG. 4 shows a graph illustrating the amplitude of a fault current being carried out in the power supply system as a function of time t [s], indicating exemplary times at which the events illustrated in FIG. 3 are implemented.

The current profile, as illustrated in FIG. 4, of the fault current I is asymmetric and results from the superimposition of an alternating current, which is supplied from the power supply system, and is of constant amplitude, and a direct current which, as is still permissible in high-voltage power supply systems, decays with a time constant of for example, about 45 ms. In this illustration, current zero crossings are denoted by circles, and maxima of the current amplitude by crosses. O denotes the time at which the contacts of the circuit breaker open in the worst case, where no synchronization controller ISD is provided. This time is located at the third current maximum. O(a) and O(b) respectively, in contrast, denote the times at which the contacts of the circuit breaker CB3 open during operation of the apparatus according to (a) or (b), respectively.

As can be seen, the use of an intact synchronization controller ISD can ensure (case (a)) that the delayed emission of the disconnection command considerably reduces the fault current on contact separation in comparison to the fault current in the case of a disconnection process without a synchronization controller. This makes it possible to very considerably reduce the mechanical loads which are caused by electromagnetic forces in the circuit breaker, and the high pressures and premature wear which are produced by the switching arc.

In case (b), that is to say when the synchronization controller ISD is not available, the contacts of the circuit breaker CB3 open in the worst case at the ninth current maximum. As can be seen, because of the direct current decay, the direct current component has already been greatly reduced. Since the mechanical loads caused by electromagnetic forces and the pressures produced by the switching arc increase, to a first approximation, in proportion to the square of the current, the circuit breaker is then relatively lightly mechanically loaded. In the abovementioned example, that is to say when the failure protection for the synchronization controller is effective, the forces can be reduced by, for example, about 56% (comparison of the current at the 3rd and 9th current maxima).

An even greater reduction in the mechanical load on the circuit breaker is achieved when the failure protection for the circuit breaker CB3 is effective.

Even if the fault current decreases with a time constant of for example only 60 ms in future high-voltage power supply systems, then a load reduction on the circuit breaker of for example 56% can still be expected when the synchronization controller ISD fails in the presence of the disconnection apparatus.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

CB1, CB2, CB3 Circuit breaker

CB0

L1, L2, L3 Lines

BB Busbar

CS Current sensors

VS Voltage sensor

PU Protective device

ISD Synchronization controller

BP1 Protective apparatus for synchronization controller failure protection

BP2 Protective apparatus for circuit breaker CB3 failure protection

ID1, ID2 Current limit value detectors AND elements

A1, A2 Delay elements

TR1, TR2 Fault current

I Time t Disconnection commands

OP, OP(b),

OP(c), OP(c') Times at which the circuit breaker contacts open

O, O(a), O(b) Times at which the fault current disappears

CCZ(a), CCZ(b)

CCZ(c), CCZ(c')

The invention claimed is:

1. A method for disconnection of a fault current (I) which has occurred in an AC power supply system, comprising:

supplying a disconnection command, which is produced in a protective device, to a synchronization controller to open a circuit breaker;

delaying the disconnecting command in the synchronization controller until the circuit breaker can be opened in synchronism with the AC power supply system;

monitoring the disconnection command emitted from the protective device and monitoring fault current, or a status signal emitted from the circuit breaker, and forming a first emergency disconnection command which acts on the circuit breaker if the fault current or the status signal is still present following a first delay time after the supplying of the disconnection command, which first delay time is greater than a sum of a natural response time of the circuit breaker and a time for quenching of a switching arc produced on opening of the circuit breaker.

2. The method as claimed in claim 1, wherein the first delay time is 30 to 70 ms.

3. The method as claimed in claim 1, comprising:

monitoring a first disconnection command which is emitted from the protective device, as well as the fault current, after the first delay time has elapsed; and independently of the first disconnection command, a second emergency disconnection command is formed if the fault current is still present after a second delay time has passed since the emission of the first disconnection command, which second delay time is greater than the first delay time.

4. The method as claimed in claim 3, wherein the second delay time is 50 to 150 ms.

5. An apparatus for disconnection of a fault current which occurs in an AC power supply system, comprising:

a protective device for production of a disconnection command for a circuit breaker;

a synchronization controller, which detects the disconnection command and in which the disconnected command is delayed until the circuit breaker can be opened in synchronism with the power supply system; and a failure protective device which ensures disconnection of a fault current when the synchronization controller is defective, to produce a first emergency disconnection command, wherein the failure protective device comprises:

a first protective apparatus comprising:

a first input for detection of the disconnection command:

a second input for detection of a fault-current signal or of a status signal:

a first delay element, which is connected downstream from the first input and has a first delay time which is areater than the sum of the natural response time of the circuit breaker and the time for quenching of a switching arc which can be produced on opening of the circuit breaker:

a first AND element which logically links the delayed disconnection command and the fault-current signal or the status signal (S) with one another: and a first input which acts on the circuit breaker and at which the first emergency disconnection command is present once the first delay time has elapsed.

6. The apparatus as claimed in claim 5, wherein the failure protective device comprises:

a second protective apparatus, comprising:

a third input for detection of the disconnection command;

a fourth input for detection of the fault-current signal;

a second delay element, which is connected downstream from the third input and has a second delay time which is greater than a sum of the first delay time, the natural response time of the circuit breaker and a time for quenching of a switching arc which can be produced on opening of the circuit breaker;

a second AND element which logically links the delayed disconnection command and the fault-current signal or the status signal with one another; and a second an output which acts on a further circuit breaker, at which a second emergency disconnection command is present once the second delay time has elapsed.

7. The method of claim 3, wherein the first delay time is 50 ms.

8. The method of claim 7, wherein the second delay time is 100 ms.

9. The method as claimed in claim 2, comprising:

monitoring a first disconnection command which is emitted from the protective device, as well as the fault current, after the first delay time has elapsed; and independently of the first disconnection command, a second emergency disconnection command is formed if the fault current is still present after a second delay time has passed since the emission of the first disconnection command, which second delay time is greater than the first delay time.

10. The method of claim 9, wherein the first delay time is 50 ms.

11. The method of claim 10, wherein the second delay time is 100 ms.

* * * * *